United States Patent [19]

Bourrat et al.

[11] 4,027,245

[45] May 31, 1977

[54] NUMERICALLY CONTROLLED MACHINE TOOL

[75] Inventors: Pierre Bourrat, Elancourt; Paul Xavier Gosset, Velizy; Pierre Riss, Chatillon-sous-Bagneux; Jean-Pierre Vignaud, Bailly, all of France

[73] Assignee: Regie Nationale des Usines Renault, France

[22] Filed: Apr. 8, 1975

[21] Appl. No.: 566,635

[30] Foreign Application Priority Data

Apr. 11, 1974 France .............................. 74.12865

[52] U.S. Cl. ..................... 235/151.11; 51/105 EC; 51/165.71
[51] Int. Cl.² .................. G06F 15/46; G05B 19/18
[58] Field of Search ................ 51/165.71, 105 EC; 235/151.11, 151

[56] References Cited

UNITED STATES PATENTS

| 2,056,707 | 10/1936 | Blazek et al. .................. 51/105 EC |
| 3,619,581 | 11/1971 | Kimura .......................... 235/151.11 |
| 3,766,369 | 10/1973 | Watanabe et al. ............ 235/151.11 |
| 3,897,659 | 8/1975 | Henry ............................ 51/165.71 |

*Primary Examiner*—Eugene G. Botz
*Attorney, Agent, or Firm*—Beveridge, DeGrandi, Kline & Lunsford

[57] ABSTRACT

In a numerically controlled machine tool, for example a grinder, a workpiece to be machined is rotated and is displaced parallel to its axis of rotation and coders provide signals corresponding to the workpiece rotation and the workpiece displacement. The workpiece is supported on a cradle mounted for pivotal motion to move the workpiece towards and away from the tool, the movement being controlled by a servo connected to a computer which receives the signals from the coders and stores data defining the required workpiece shape.

19 Claims, 11 Drawing Figures

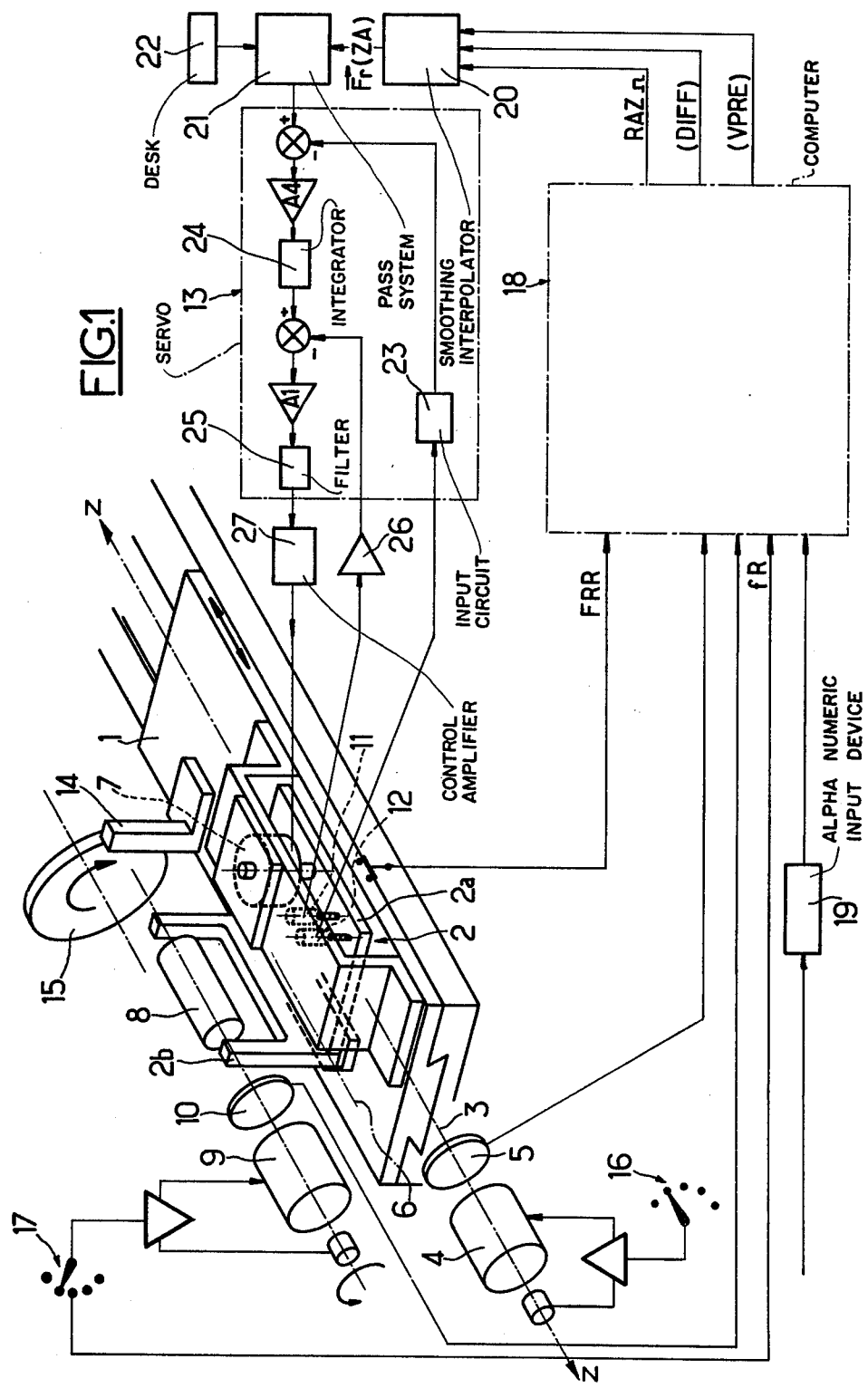

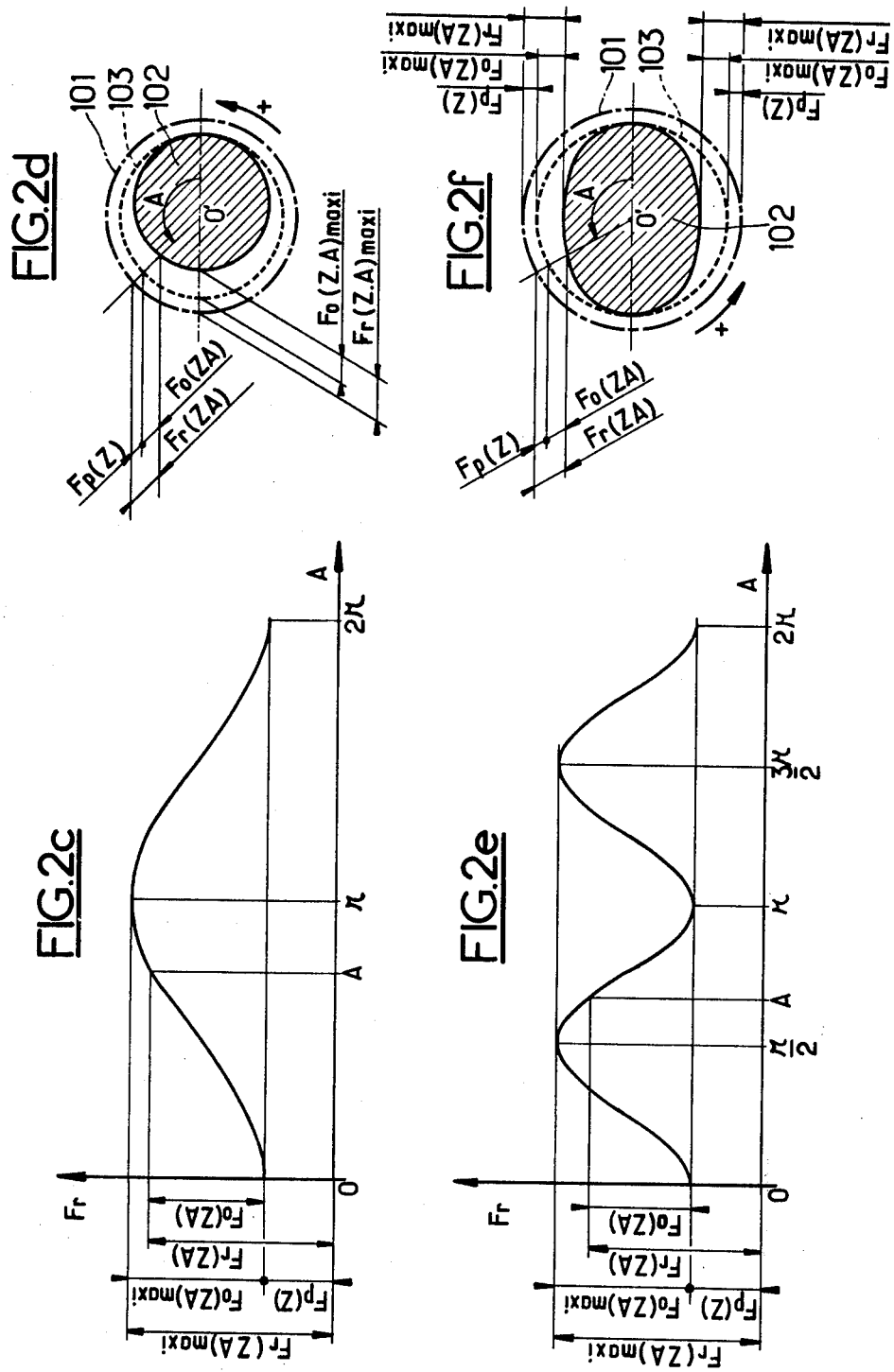

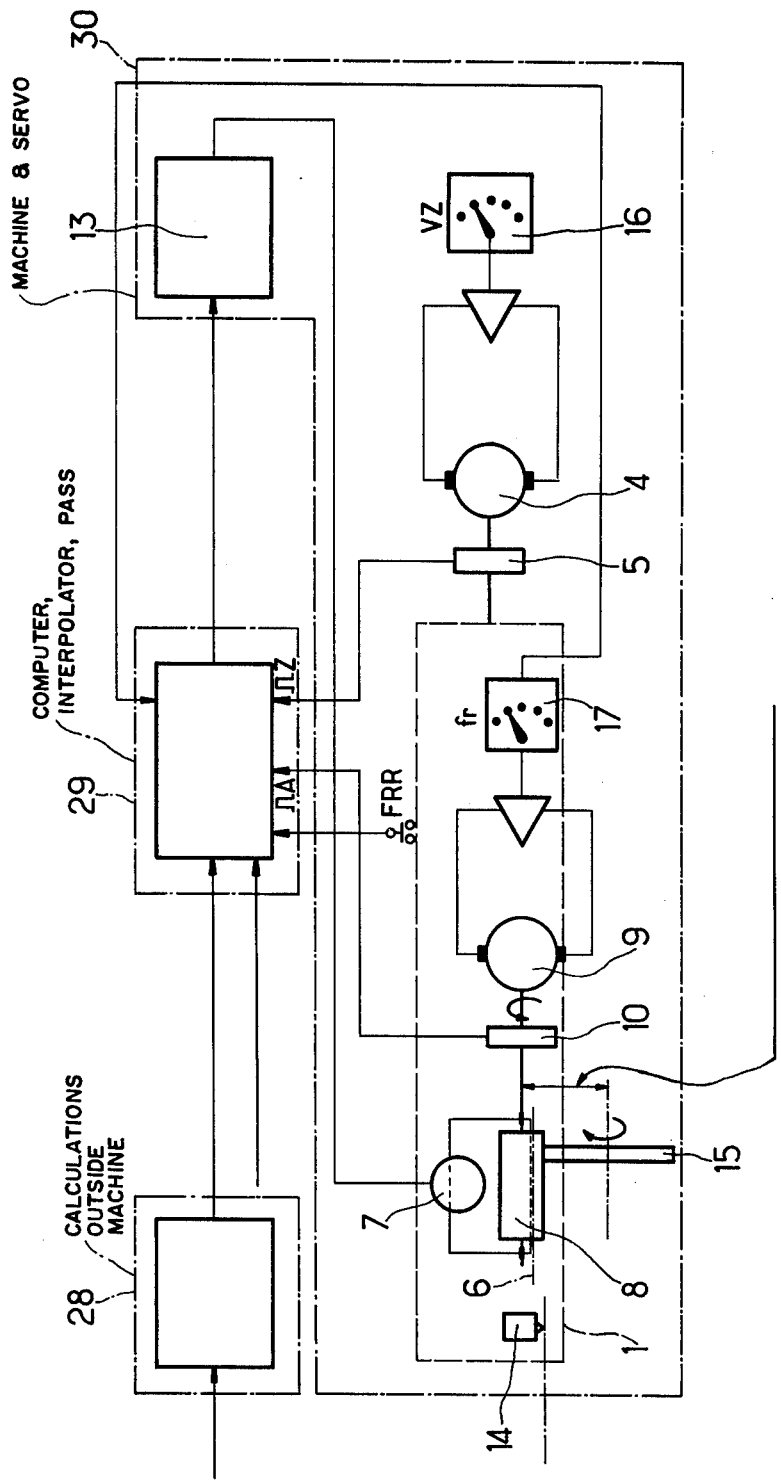

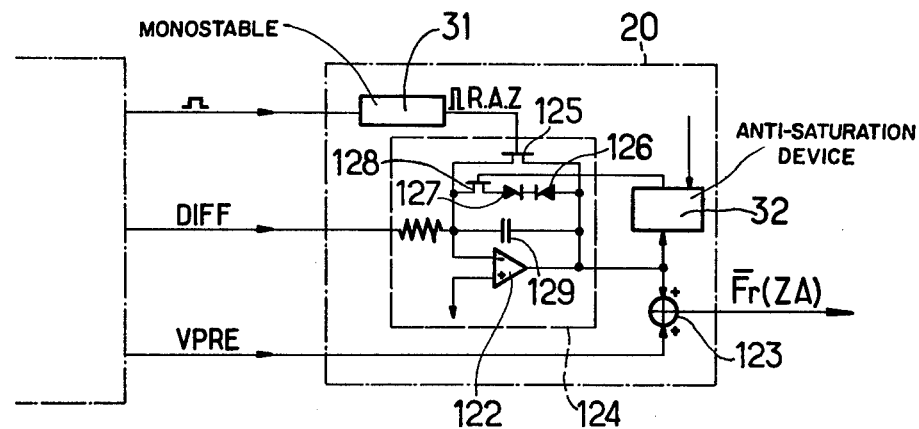
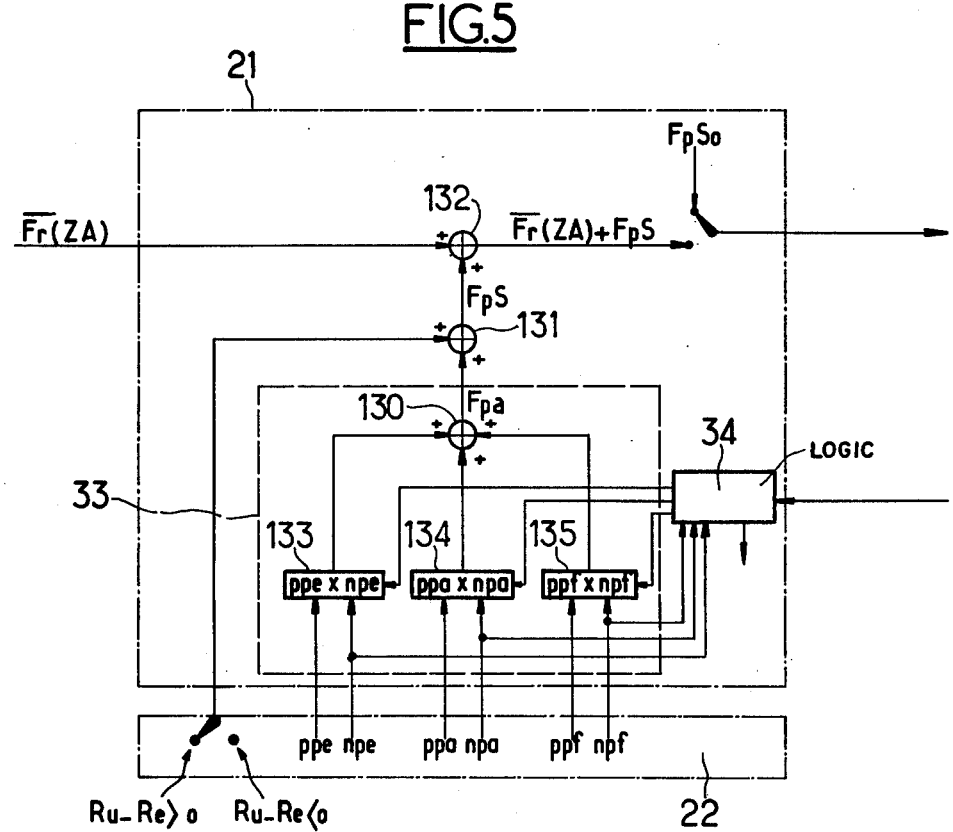

NUMERICALLY CONTROLLED MACHINE TOOL

The present invention is concerned with a process and a machine tool programmed for numerical control, for the machining of evolute surfaces of revolution, in particular a grinder for the machining of components such as three-dimensional cams or moulds for reproduction for the machining of the peripheral surfaces of pistons of internal combustion engines.

In this last application, the surfaces to be machined have cross-sections which are substantially elliptical and evolute according to the axial position of the sections.

The classic solutions for machining such surfaces, known in the state of the art, consist of adjusting the radial displacement of the machine tool as a function of the rotation of the component, while machining a profile of the component at each turn, with an incremental axial displacement of the tool. This system has the disadvantage of requiring a complex control system and of making the tool work in a discontinuous fashion.

Also known is a control system in which the conjugate movements of the tool and the component cause a programmed helical trajectory, producing the surface to be machined, to be described at the point of contact. If in this case the tool works in a continuous manner, the programming of the helicoidal trajectory and the co-ordination of the movements of the tool also necessitate a considerable amount of apparatus, particularly at the level of the computer required, given the requirement for co-ordinating the tool movements in three directions of displacement, as in classic numerical control, the three directions corresponding to the speed of rotation of the component, the transverse feed and the longitudinal feed of the tool.

In addition, to change the pitch of the helix characterising the path, it is necessary to reprogramme the path.

The process of numerically controlled machining according to the present invention more particularly uses a grinder enabling the production of such surfaces starting from more simple and less expensive means than those generally employed, especially as far as the computer is concerned. The process of numerically controlled machining which is the subject of the invention is characterised in that the position of a machining tool or grinder, as a function of the surface of revolution to be produced on the component, is defined starting from the angle of rotation A of the said component, the position z of the tool along the axis of rotation of the said component and is adjusted by a servo controlling the variation of the relative position of the grinder with respect to the workpiece.

One no longer defines by programming a path over the surface to be produced, but the surface itself, this being performed with the aid of a mathematical definition requiring a small number of given items. Thus the surface having been very simply programmed, independently of the manner in which the tool will produce it, it is possible at the level of the machine without intervention of programming to change the pitch of the helix, for example.

The machining process according to the present invention is more particularly suitable for the obtaining of surfaces defined by geometric "deformation" of a basic body of revolution, which is preferably simple such as a cylinder or cone, for example, of radius R. This deformation is characterised by an algebraic quantity $F_r(z,A)$ subtracted from the radius R. To obtain a deformation of the generatrix of the basic body of revolution, it suffices to have available a function $F_p(z)$, known as a profile function, z being the dimension or level of a standard section, a dimension measured by projection on the axis of the cylinder thus deformed.

The function $F_p(z)$, known as a "profile" function, can be defined mathematically or by a limited number of points between which an interpolation will be made, preferably linear, without excluding any other mode of interpolation which does not require too large a volume of calculation.

If one does not introduce other types of deformation, the sections of the basic body of revolution thus deformed will remain circular. To obtain sections other than circular, there will be added algebraically to the function $F_p(z)$ a function $F_o(z,A)$, known as an "ovalisation" function, depending on z and on A: the angle varying between 0 and 400 units and permitting the marking, given a starting radius, of a standard radius on the section of dimension z considered. Thus $F_r(z,A)$ becomes a function of z and of A and is written:

$$F_r(z,A) = F_p(z) + F_o(z,A)$$

The function $F_o(z,A)$ is defined utilising a Fourier series, limited for example to 10 harmonics. In this Fourier series, the coefficients ai are functions of z. If it is desired to limit to sections possessing at least one axis of symmetry, a Fourier series comprising only cosines can be considered. If it is required to describe sections having more than one axis of symmetry, it is convenient to take for the fundamental frequency not the frequency of rotation of the workpiece but a frequency equal to the product of the frequency of rotation multiplied by the number of axes of symmetry desired. Thus for example if b equals the number of axes of symmetry, i equals the order of harmonics for a given dimension z, then $F_o(A)$ is $$F_o(A) = \sum_{i=1}^{n} ai\,(1 - \cos i\,b\,A)$$

$$= \sum_{i=1}^{n} ai - \sum_{i=1}^{n} ai \cos i\,b\,A$$

The convention of writing which results in the presence of the term $$\sum_{i=1}^{n} ai$$

is not indispensable but it enables the obtaining in a simple fashion of $F_o(z,0) = 0$ and thence $F_r(z,0) = F_p(z)$, which means that the deformation of the generatrix of the basic cylinder corresponding to the angle A = 0 is due uniquely to the function of the profile.

To define $F_p(z)$, it has been seen that it suffices, for example, to provide a limited number of points between which an interpolation will be made, preferably linear. To define $F_o(z,A)$ in a section, it suffices to define the Fourier coefficients. To obtain the definition $F_o(z,A)$ over the whole surface, one proceeds again by interpolation, fixing the value of the Fourier coefficients in certain privileged sections of given dimensions or levels; between these sections the value of the coefficients is obtained by interpolation, preferably linear, between the coefficients of harmonics of the same order. The continuity of the tangential plane at any point of the surface thus defined is ensured, except in the privileged sections where there are defined the break values of the profile function $F_p(z)$ and in the privileged sections where there are defined the coefficients of the ovalisation function $F_o(z,A)$, if one has selected linear interpolation to obtain $F_p(z)$ and $F_o(z,A)$ between the privileged sections. Utilizing more complex moods of interpolation, one can obtain continuity in the tangent plane at all points of the surface. The interest in the type of surface definition selected is three-fold:

a. Few given data items are necessary to programme a surface (about 5–10 profile values with their corresponding dimensions), plus 2–10 harmonic coefficients in 4–10 privileged sections with the corresponding dimensions for a piston, i.e., about 70 numbers in place of about 100,000 to 200,000 numbers to define the same surface with the presently known standard processes for obtaining a comparable precision.

b. The surface is defined independently of the path of the tool, which permits the variation of the speeds of rotation and of advance independently of one another and thus permits a helix to be described with a pitch of any value without affecting the given programming data.

c. As the computer derives in real time the function $F_o(z,A)$ by calculating the interpolation of the values of the Fourier coefficients, it can very easily correct the latter to take account of the transfer function of the positioning servo which regulates the distance, or radius, of the tool from the axis of the workpiece. The correction is easy because the computer knows the frequency of each harmonic and because, a priori, it has been possible to introduce into its memory the error factor of the servo at different possible frequencies for a harmonic.

The machine for carrying out the process of the present invention comprises a tool fixed in position, for example a grinding wheel.

The workpiece is driven in rotation about its axis. The workpiece and the means for driving it in rotation are mounted on an oscillating support enabling its axial distance with respect to the tool or with respect to the axis of the grinding wheel to be varied, under the action of the means for controlling the oscillations of the support.

The assembly comprising the workpiece and the means for controlling its rotation and oscillation is mounted on a table which can be displaced in longitudinal translation parallel to the axis of the workpiece, in front of the fixed-position tool or grinding wheel, for as far as this machine is concerned, the basic body of revolution is a cylinder. If the basic body of revolution is a cone of angle 2C, the angle formed by the axis of the workpiece and the axis of displacement of the table is then equal to C. Deformations of the basic cone can be obtained in the same manner as when the starting point is a basic cylinder.

This simple mechanical assembly reproducing the parameters for generating the surface to be machined is completed by coders associated with the movements of rotation and translation of the workpiece, which they measure and transmit to a computer controlling, by means of a position servo, the third parameter, the tool-workpiece distance, starting from the oscillating cradle, under the action of instructions calculated from the given geometric data to be reproduced.

The control assembly comprises, in the preferred form, the computer, a smoothing interpolator and a system for controlling successive passes. It receives directly, or from a perforated tape, the given geometric data in the selected sections of the surface to be machined and produces a servo instruction for positioning the oscillating support.

The coders are advantageously angular incremental coders transmitting pulses which are totalised in the memory of the computer. They have a small number of points, of the order of 400.

The coder which is driven in rotation with the workpiece can be provided with a double function of synchronising the calculations and instructions and of angular indexing of the rotation of the workpiece. The synchronisation of the calculations is effected at each transition or wave front of the coder.

Thus, because of the synchronisation of the calculations and of the transmission of instructions by the transitions of the coder, these calculations are effected only on angular values chosen to be whole numbers. For example, for a coder of 400 points there will be 400 corresponding units of the circumference. The consequence of this arrangement is to make it possible to use such a coder of 400 points which would be clearly insufficient to obtain the required precision with the classic methods. The precision of obtaining the value A is determined essentially by the precision in outline of the crenellations of the coder disc and is independent of the number of points, which permits the use of a coder with a small number of points, which is cheaper and more reliable.

On the other hand, if the calculation took place as a process asynchronous with respect to the rotation when the computer interrogated the coder, the precision in the knowledge of the angle A would be determined by the number of points of the coder and this number would have to be increased to about 5,000.

This arrangement also permits the calculations of the cosine functions to be dispensed with, replacing them with a direct interrogation of a table of cosines placed in the memory of the computer, which can be limited to 100 values corresponding to 100 units of a quadrant of the circumference; the integral angular values make any interpolation between two successive points useless, given this table.

The removal of these calculations permits the obtaining of cosines corresponding to the number of required harmonics with a sufficient speed, which is impossible with the classic calculating means such as a universal mini-computer. A specialised calculator with micro programmes uniquely devised for the described invention is then necessary.

Thus, there is established a table of angular cosines corresponding with this number of points of the coder, brought down to 100 values corresponding to the 100 angular units of each quadrant of the circumference. At the speed of rotation of one revolution per second, there is thus obtained an instruction calculation at each unit.

Compared with the known solutions in which, when cosines intervene one makes the computer assume a cosine function, needing sub-programmes and a longer calculation time, this solution is thus very advantageous from the point of view of saving time.

In the same way, taking into account the precision, while a coder with a large number of points would be necessary to control the angular position of the workpiece, this solution enables a coder with only a small number of points to be used, which is very much less costly.

Finally, since the computer effecting the command calculation operations must, in view of the selected synchronisation mode, possess a system for acquiring interrupting signals, it is possible to utilise the latter to count the pulses coming from the coders and thus to replace the traditional absolute coder by a simple coder-pulse generator, for example one per unit, the calculator itself developing the content of memory words representing respectively the dimensions z and A.

The pulses from the coders cause, at the computing level, priority interruptions which ensure that the dimensions of angular position of the workpiece (hereinafter called A) and of relative axial position of the workpiece and tool (hereinafter called z) are produced without delay.

The variation of the relative distance of the workpiece and tool, the only variable controlled by the servo instruction, is obtained by the pivoting of the cradle supporting the workpiece, which oscillates and is compensated by a static balancer, controlled by a vibrating pot, known in itself, having an electromagnet excited by a servo receiving from the control block or assembly a position instruction. This instruction is the sum of the instructions, on the one hand calculated by the computer and a function of the angular position and relative axial position of the workpiece and tool and on the other hand corresponding to a static position of the oscillating cradle taking into account successive feeding movements of the tool or machining passes.

As already envisaged, the calculation of the instruction transmitted to the servo takes into account the value of the profile in different sections, of the ovalisation in the same sections or in different sections, of a correction avoiding the systematic errors due to the servo, and finally of successive offsets permitting the different passes to be carried out during the machining.

In order that the invention may be better understood, there will be described, by way of example and in a nonlimiting manner, a mode of construction of a numerically controlled machine according to the invention, a grinder intended for the machining of complex surfaces of revolution of piston lathe reproducers, this mode of construction being given by way of example and being shown on the attached drawing, in which:

FIG. 1 is a general diagram of a grinder embodying the invention with its control system;

FIG. 3 is a simplified synoptic diagram of the grinder of FIG. 1;

FIG. 4 is a diagram of the smoothing interpolator, forming a part of the said grinder;

FIG. 5 is a diagram showing the principle of operation of the device and the system of passes of the said grinder.

Figure 2A:
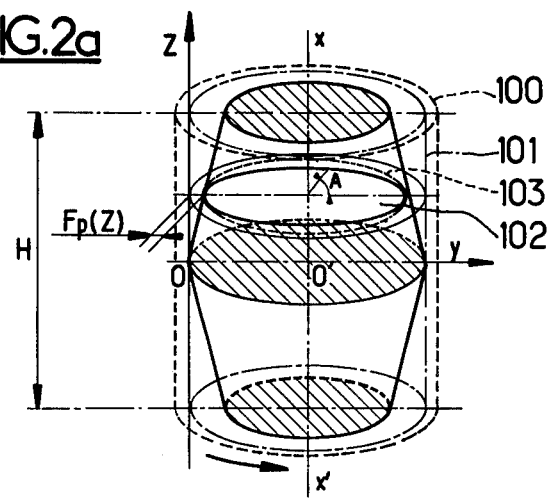
FIG. 2a is a schematic representation of the geometry of a piston reproducer to be machined, with the grinder of FIG. 1, this figure being completed by the detailed diagrams in FIGS. 2b, 2c, 2d, 2e, 2f and 2g.

The grinder shown diagrammatically in FIG. 1 comprises a table 1 on which is mounted a workpiece-carrying cradle 2. This table 1 is controlled in longitudinal translation along an axis z by a screw 3 driven by a direct current motor 4 and a reducing gear. The assembly of motor and reducing gear ensures the longitudinal displacements along the axis z for the slow advances for rough machining, for semi-finishing and for finishing and for the rapid advances for positioning. The motor 4 is for example a direct current motor having a range of speeds of the order of 30–3,000 revolutions per minute.

A pulse-generating coder 5 is also driven by the DC motor 4. The table 1 comprises travel limiters, not shown, especially for the rapid displacements.

On the table 1 there is mounted the workpiece-carrying cradle 2, which is substantially in the form of a square and is articulated on the table through its angular part, about a pivotal axis 6, parallel to the axis z. A wing 2a of the cradle 2 is actuated by the mobile element of a vibrating pot 7, which is for example an electro-magnetic exciter of known type. The vibrating pot 7 is mounted on the table 1 of the grinder.

A wing 2b, perpendicular to the wing 2a of the oscillating cradle 2 holds the workpiece 8 to be machined, which is here a piston reproducer, by means of guiding bearings which are not shown. A driving motor 9 (for example a DC motor of which the range of speeds extends from 30–300 revolutions per minute) is also rigid with the wing 2b of the oscillating cradle 2. The motor 9 drives a pulse-generating coder 10 which is concerned with the angular position of the workpiece 8.

The movements of the movable part of the vibrating pot 7 cause oscillation of the rocking cradle 2 and therefore the feeding movement of the workpiece 8 to the grinding wheel 15, which combines with the rotation A of the workpiece 8 and its advance z of translation with the table 1.

There are provided for example six speeds of possible rotation for the reproducer 8, for instance 0.5, 1, 2, 5/2, 4 and 5 revolutions.

A static balancer (not shown) ensures the balance of the workpiece-carrying cradle 2 about its pivotal axis 6 on the table 1 of the grinder. A speed pick-up 11 of the electro-dynamic type and a position pick-up 12, for example of the bridge capacitor type, are utilised in the loop of a servo system 13 and are mounted between the table 1 and the rocking cradle 2.

A grinding diamond 14 is also mounted on the table and can be brought to a position for setting the grinding wheel 15 at the end of each pass or cycle of machining.

References 16 and 17 designate respectively the rotation speed selectors for the motors 4 and 9.

The grinder also comprises a computer 18 provided with an alpha-numeric input device 19 and connected to a smoothing interpolator 20. In the preferred embodiment computer 18 is a mini-computer and may, for instance, be Model SPC-16-60 manufactured by the General Automation Incorporated Company.

A pass system 21 receives signals simultaneously from a desk 22 and from the above-mentioned smoothing interpolator 20 and transmits a signal to the servo 13. This servo 13 comprises, among other elements, an electronic circuit 23 connected to the position pick-up 12, an integrator 24 and a filter 25. A pre-amplifier 26 is arranged between the speed pick-up 11 and the servo 13. Finally, the servo 13 controls the vibrating pot 7 through a control amplifier 27. The relative distance workpiece-grinding wheel 15 remains constant (this generates a cylinder) until the contact point grinding wheel-workpiece enters the useful portion of the workpiece. The pass end is detected by the arrival of the workpiece useful portion to the maximum dimension.

FIG. 2a is a schematic representation in perspective of the piston reproducer, machined directly by grinding by means of the machine embodying the invention.

The barrel shape of the piston reproducer 8 obtained by machining a rough cylinder 100 is shown diagrammatically in full lines and is limited at its ends by two hatched plane sections, a hatched central section showing its largest cross-section, encircled by a circumscribed cylinder 101 represented in dot-dash lines and having the same axis of rotation XX', which crosses the plane of maximum section at O', selected as a plane of origin for the dimensions of level z of the sections Sz of the reproducer surface 8, of which the corresponding profile will be called $F_p(z)$ and the ovalisation will be called $F_o(z,A)$, the axis OO'Y (passing through the points of tangency of the profile of maximum section with the circumscribed cylinder) being considered as the axis of origin of the angles A measuring the angular offset of the points of the surface to be reproduced, each defined by their level z and their angle A.

The reference 102 designates a section Sz and the reference 103 designates a circle circumscribed on the said section Sz marked as 102. The function $F_r(z,A)$ which must define the instruction generator is the sum $F_p(z)$, the value of the profile, and of $F_o(z,A)$, the ovalisation:

$$F_r(z,A) = F_p(z) + F_o(z,A)$$

Figure 2B:
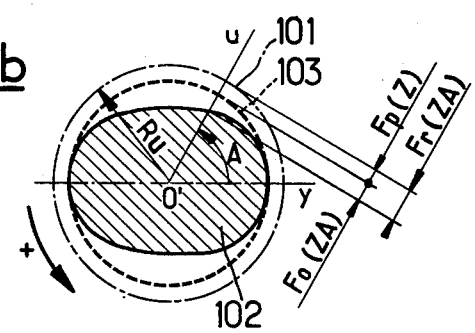

The tool must penetrate by an amount $F_r(z,A)$ for a given z and A, in the cylinder circumscribed on the machined reproducer 8. A section Sz at the dimension z of the reproducer 8 is shown in FIG. 2b. The function $F_r(z,A)$ considered in the section S(z) for an angle A equals (O'Y,O'u) varying from 0 to $2\pi$ in the positive sense indicated on FIG. 2b, to be represented in the plane $(F_r,A)$ in which z is considered as a parameter (FIG. 2e).

This representation of the function $F_r$ in the plane $(F_r,A)$, for A varying between O and $2\pi$, will be called the representation of a geometric cycle.

According to whether the profile to be reproduced has one or two axes of symmetry, one can define pistons, improperly called with "one boss" and pistons with "two bosses": it is the same for piston reproducers which are the image of a piston, but on a different scale.

The piston reproducer with one axis of symmetry in each plane S(z) shown in FIG. 2d in a section situated at dimension z, presents a symmetry with respect to a straight line passing through O'. FIG. 2c represents the corresponding geometrical cycle.

The piston reproducer with two axes of symmetry in each plane S(z) shown in FIG. 2f presents a symmetry with respect to the centre O' of the circle circumscribed on the section S(z). FIG. 2e shows the corresponding geometrical cycle.

The "physical" signification of the geometrical cycle corresponds to the periodic function $F_r(z,A)$ to be elaborated (for a given z).

The function $F_p(z)$ is not a periodic function. For one given dimension z $F_p(z)$ is a constant (compare FIGS. 2a, 2b, 2c, 2e).

The representation of $F_p(z)$ is given by an axial section on FIG. 2a corresponding to a longitudinal profile of the reproducer at a height H of the latter. In reality, the curve $F_p(z)$ is less "angular." One can define it with the aid of a certain number $n_z$ of points between which one interpolates linearly. This number of points depends on the shape and on the precision which is required.

The definition of $F_p(z)$ is summarised by a table (or matrix) of $(n_z \times 2)$ elements:

$$F_p(z_1) \ldots F_p(z_n)$$
$$z_1 \ldots z_n$$

The dimensions $z_1, \ldots, z_n$ are the dimensions of the said sections referred to as "privileged sections for the profile."

The calculation of the Fourier coefficients $a_i(z)$ corresponding to the formula $$F_o(z,A) = \sum_{i=1}^{n} a_i (1 - \cos b\, i\, A)$$

will be guided by the following considerations:

These coefficients $a_i(z)$ are different from one standard section S(z) situated at the dimension z to the following $S(z + I_z)$ located at the dimension $(z + I_z)$, ($I_z$ being the increment along the longitudinal axis z).

The name "priviledged section" will be given to a section $S(z_p)$ such that all the Fourier coefficients are known up to the order $n$ ($S(z_p)$ is located at the dimension $z_p$).

Starting from the privileged sections, where the Fourier coefficients are perfectly determined, one calculates the Fourier coefficients of the same harmonic order $i$ of any section S(z), located between the said privileged sections $S(z_p)$ and $S(z_{p+1})$, z being comprised between $z_p$ and $z_{p+1}$ by linear interpolation:

$$a_i(z) = a_i(z_p) + \frac{z - z_p}{z_{p+1} - z_p} [a_i(z_p + 1) - a_i(z_p)]$$

in which $(l,n)$ and $P$ $(l,k)$ the number of privileged sections for the ovalisation being called $k$.

In this way, there are defined $k$ privileged sections for the ovalisation of a piston reproducer. There are $n$ Fourier coefficients in each privileged section $S(z_p)$. To store these "privileged" coefficients, there is used a table (or matrix) of $(n + 1) \times k$ terms ($n$ equals the number of harmonics, one for the dimension $z$).

If one chooses, for example, $k$ equals 4, if $n$ equals 10 there is thus a matrix of 4.11 equals 44 elements in the representation of which one notes the Fourier coefficient $a_{ij}$ of a section $j$ of harmonic order i. The coefficients of $S_1$ can be written $a_{11}\, a_{21} \ldots a_{n1}$ and those of $S_k$ : $a_{1k}\, a_{2k} \ldots a_{nk}$ from which the matrix representation of the Fourier coefficients is:

$$\begin{bmatrix} a_{11} & a_{12} & a_{1j} & a_{1k} \\ a_{21} & a_{22} & a_{2j} & a_{2k} \\ a_{i1} & a_{i2} & a_{ij} & a_{ik} \\ a_{n1} & a_{n2} & a_{nj} & a_{nk} \\ z_1 & z_2 & z_j & z_k \end{bmatrix}$$

Summarising, the geometric definition of a piston surface, or reproducer, to be reproduced will be a function of a profile defined by the table:

$$\begin{bmatrix} F_p(z_1) & F_p(z_x) & F_p(z_{nz}) \\ z_1 & z_x & z_{nz} \end{bmatrix}$$

with the ovalisation defined by the table:

$$\begin{bmatrix} a_{11} & a_{12} & a_{1j} & a_{1k} \\ a_{21} & a_{22} & a_{2j} & a_{2k} \\ \vdots & \vdots & \vdots & \vdots \\ a_{n1} & a_{n2} & a_{nj} & a_{nk} \\ z_1 & z_2 & z_j & z_k \end{bmatrix}$$

and of the number $b$ equals 1 or 2, according to whether sections with one or two axes of symmetry are required. The privileged sections of the first table, known as the profile table, indexed by their dimension or level $z_x$, can be identical or not identical to those of the second table, known as the ovalisation table, indexed by their dimension or level $z_j$.

This geometric definition determines the process of generation illustrated by the diagram of FIG. 3, which shows the succession of operations of the method of manufacturing a workpiece on the machine of the example described. This process is effected from three levels:

the level I, referenced 28, is a level of preliminary calculation effected outside the machine. It consists in calculating the different numerical elements characterising the workpiece to be realised (shape, ovalisation, in each of the privileged sections as well as the number $b$).

The elements are transmitted by perforated tape, for example, or by direct introduction on the keyboard of the alpha-numeric input console for the operations of level II referenced 29, which are effected by: a numerical computer; a "smoothing interpolator"; and the device called "pass system" which assures the carrying out of the machining passes required.

The operations of level III referenced 30 are effected by the mechanism of the machine and its position servo.

The operations of level I consist in the elaboration of the numerical given data necessary for level II. This given data is derived from the plan of the workpiece to be produced. The work carried out at this level is effected outside the machine; it can be effected by hand or with any calculation-aiding device. While the derivation of this data is known to those skilled in the art, for the purpose of clarity it is explained below.

Assuming that the workpiece to be machined is a piston the geometrical data of the outer surface of the piston described on pages 24 and 25 of the specification is obtained. That is, profile sections are selected to get an approximation of the longitudinal shape of the piston, and the corresponding profiles are determined. Similarly, sections of ovalisation are selected and by using a standing program of Fourier series the ovalisation coefficients are determined.

The above calculations are performed on a desk computer such as the Hewlett-Packard Model 20, which includes a standard mathematical calculation set including a Fourier series program.

The operations and the device of level II consist in providing in real time the instruction, in the form of a voltage analogue, to the servo system controlling the relative position of the grinder and workpiece, given the under-mentioned elements:

a. the numerical computer 18, a mini-computer of which the cycle time is 1 microsecond. It is provided with a level of external interruptions, logical inputs and outputs and with two analogue outputs. It effects a group of operations which permit, when in the machining cycle the servo controlling the relative position of the grinder and workpiece needs to be guided by an evolutive instruction, to compute in real time the relative distance between the grinder and the workpiece without the intervention of the advance by successive stages of the rocking cradle towards the grinding wheel, which advance is ensured by the "system of passes." A flow-chart of a computer program which may be used to perform the necessary functions is shown in FIGS. 6 to 9.

The above-mentioned group of operations, which must not be confused with those of level I, comprises a task, known as the "dialogue," which formulates information defining the surface in such a manner as to prepare the calculation in real time. This task is effected when the machine is not in operation. This dialogue is included in the flow-chart of FIG. 6 and permits the manual entering at the alpha-numerical console of the elements of the profile table, the ovalisation table, the number $b$, as well as the dimension of the profile and ovalisation tables, that is to say the number of privileged sections of profile, the number of privileged sections of ovalisation as well as the number of harmonics.

In this dialogue task, there is a coherence control of the entered information. In addition, the dialogue is completed by a task of "acquisition" of the data coming from the desk, notably: the speed of rotation $f_r$ or frequency of rotation in revolutions per second; and the starting values of the counts $z$ and A described later.

In summary, "dialogue" and "acquisition" have for their aim to arrange in the fixed installation tables in the memory of the computer all the data necessary for the calculation in real time, this data being put in the form which will reduce to a minimum the time necessary for carrying out the real time calculation.

These items of data are:

the number of privileged sections of profile, $n_z$ the number of privileged sections of ovalisation, $k$ the number of harmonics, $n$ the number $b$ the dimensions or levels ($z_x$) of the sections of profile, classed according to $z_x$ increasing (maximum number provided in this machine: 20)

the corresponding values of profiles of the same order (succession of $F_p(z_x)$)

the succession of values such as $(z_{x+1} - z_x)$ the succession of values such as $(F_p(z_{x+1}) - F_p(z_x))$ the dimensions or levels ($z_j$) of the sections of ovalisation for $z_j$ increasing (maximum number provided in this machine: 10)

the succession of values such as $(z_{j+1} - z_j)$ the values of harmonics of the section $j$ equals 0: $a_{10}$, $a_{20}$ .... $a_{n0}$ the values of harmonics of the section $j$ equals 1: $a_{11}$, $a_{21}$ .... $a_{n1}$ the values of harmonics of the last ovalisation section $a_{lk}$, $k$ .... $a_{nk}$ the series of values expressing between the section $j$ equals 1 and $j$ equals 0 the algebraic increase of each harmonic, namely: $(a_{n,1} - a_{n,o})$ for each harmonic of order $n$, etc., this continuing until between the last section of ovalisation and the one before the last.

The tasks of the "calculation in real time" can thus be broken into:

a task of management of the pulses coming from the incremental coders, a task of setting initial conditions;

a task of calculation, properly so-called, of the relative distance between the grinder and the workpiece.

The management of the pulses from the coders is a task initiated by the transitions of the pulses themselves, these causing the calling of a corresponding interruption subprogramme. At each transition coming from the coder z or A, one increments the word-memory taking the place of counter z or the word-memory taking the place of counter A; this last is evidently treated as a counter modulo 400 units. In addition, at every 2.5 milliseconds, that is to say at each impulse for a coder of 400 points at $f_r = 1$Hz, the sub-programme positions a calculation demand indicator. This calculation demand indicator is referred to as a DCA Circuit on the flow-charts and hereinafter in the specification. It is a flip flop set from 0 to 1 at every time that a calculation is demanded and the period of tempo for passing from one state to the other is 2.5 ms, as above indicated. It is in this way that the synchronisation of the task of calculation is carried out. Finally, at each rotation of the coder z or A it is verified that the number of pulses taken into account is equal to the number of points of the coder and if not one starts a safety operation. Thus, the interruption sub-programme assures the management of the counters A and z, the synchronisation of the calculations and the verification of the number of pulses received at each rotation. The task of setting the initial conditions of the counters A and z consists in awaiting, after a return to the starting position of the machine, the remaking of a micro-contact which warns the computer that the machine zero in z will be supplied to it by the first "pip" in the rotation of the coder z. On receipt of this pip, the word-memory known as "counter z" is set to its initial condition. The initial value can be different from zero to take into account the wear in the points between which the workpiece is held, or the replacement of the counter-points for pistons of different lengths; this permits operation with a zero-workpiece or a zero-machine floating with respect to one another. In the same way, after the remaking of the above-mentioned micro-contacts takes place, at the first angle or $\theta$ pip. This triggers the counting of counter A, the triggering of the DCA Circuit with a $\Delta = 2.5$ ms period, and at last the progressive workpiece motion towards grinding wheel 15 to a location that permits generating a cylinder that is connected with the beginning of the workpiece useful portion in view of the pass to be performed. The counting word A is set to its initial condition. This initial condition takes account, in addition to the facility of providing floating zeros, of a term called "anticipation." Anticipation is necessary for the calculation in real time, in fact, the calculation is not carried out in a constant time; the variable delay between the instant at which the variables z and A are read and the instant of termination of calculation would introduce a non-constant systematic error, which would be prejudicial to the good operation of the machine. On the other hand, if one calculates the relative distance between the grinder and the workpiece which corresponds to the values of z and A, 2.5 milliseconds later, one can put into reverse this distance, the result of the calculation, and one can supply it as output at the time of the next request for calculation. In fact, the anticipation realised is not one period of sampling (2.5 milliseconds), but two to deliver as output not the relative distance between the grinder and the workpiece at the instant of the calculation demand uniquely, but additionally the variation of this distance during the next period. These two pieces of analogue information will be used by the smoothing interpolator. It is necessary to anticipate the dimension z of the quantity $2V_z\Delta T$ (with $V_z$ equals speed of advance, $\Delta T$ equals 2.5 milliseconds), but as far as $V_z$ is concerned on the machine $2V_z\Delta T$ remains negligible whatever may be $V_z$ and it is necessary to anticipate the angle A of the quantity $2f_r\Delta T \times 400$. Since $f_r$ is a constant during one machining, it can be acquired, outside the machining operation, which explains why the setting of the initial condition of A effects once for all the anticipation of A at a given speed of rotation.

Figure 8:
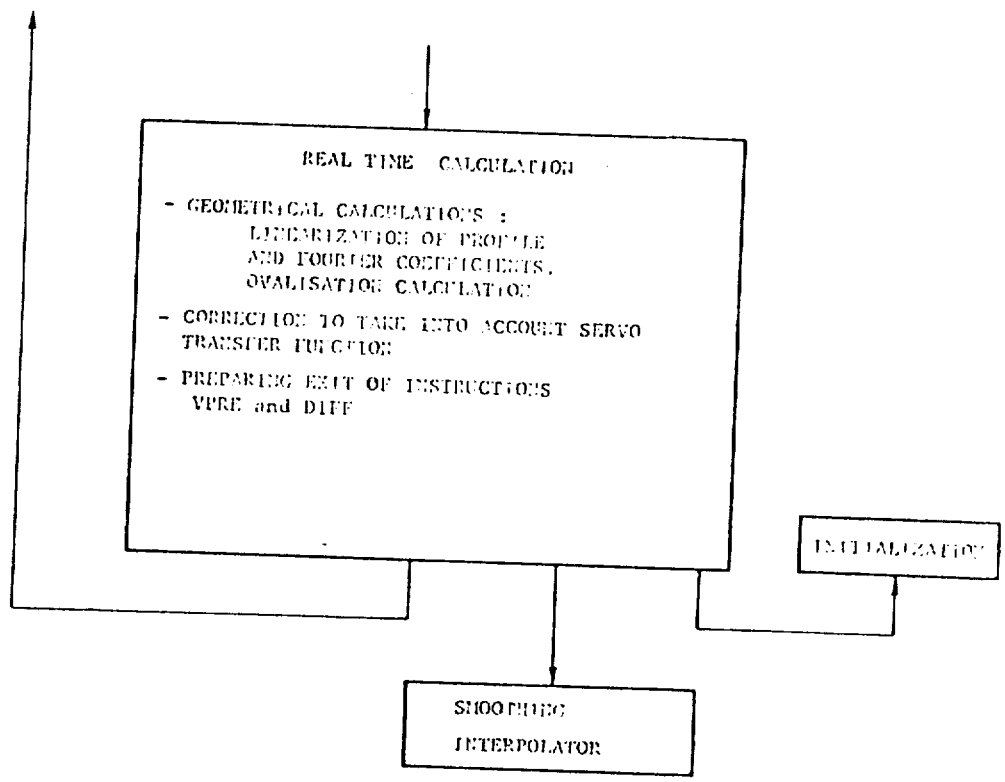
Figure 9:
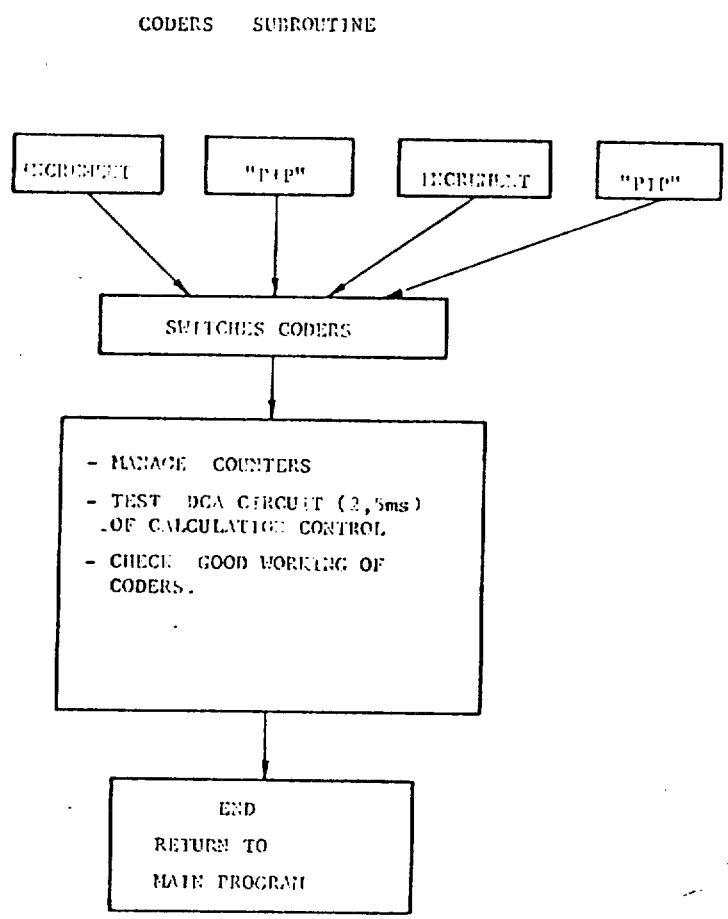

The calculation in real time, represented in the flow-chart of FIG. 8, properly so-called, is broken into:

a waiting for the calculation demand and output of the necessary analogue quantities for the smoothing interpolator;

a calculation of the profile by interpolation, that is to say $F_p(z,A)$ anticipated;

a calculation of the Fourier coefficients $a_{ij}$ by interpolation; a correction of the coefficients $a_{ij}$ to take into account the transfer function of the positioning servo, owing to which there is obtained $a'_{ij}$;

a search of the values $\cos(b\ i\ A)$, $i$ being the order of the harmonic;

a product of the $a'_{ij}$ factors by the $\cos(b\ i\ A)$ factors;

an evaluation of the ovalisation, that is to say $F_o(z,A)$ anticipated;

an evaluation of $F_r(z,A) = F_o(z,A) + F_p(z) = F_r(z,A)$ anticipated by $(2.5 \times 2$ milliseconds) and which becomes $F_r$ anticipated by 2.5 milliseconds only, when the next calculation demand is presented;

a preparation of the analogue outputs for the smoothing interpolator.

The calculation of the profile is carried out according to a standard method by the application of the selected interpolation formula (linear or parabolic).

The calculation of the Fourier coefficients $a_{ij}$, in the same way, necessitates a linear or parabolic interpolation which requires only the standard methods.

The correction of the Fourier coefficients, to take into account the transfer function in open loop of the positioning servo, represented in the flow-chart of FIG. 8, is carried out as follows: let $a_{ij}$ be a coefficient of order $i$, the rotation taking place at constant speed $f_r$, this harmonic energising the servo at a frequency $f_i$ equals $f_r \times i \times b$. If one knows the gain of the servo in open loop at this frequency $f_i$, one can easily calculate the correction to be applied at $a_{ij}$; let $a'_{ij}$ be the coefficient, corrected, and one has:

$$\frac{a'_u - a_u}{a_u} = \frac{1}{G(f_i)}$$

$G(f_i)$ being the gain in open loop of the positioning servo 12 for a sinusoidal energisation of frequency $f_i$.

In fact, to be perfect, having taken into account the fact that $G(f_i)$ is not infinite on the one hand, it would be necessary, on the other hand, to take into account the fact that the argument of the complex number representing the gain in open loop of the positioning servo $F_r(z,A)$ is not a constant but depends on $f_i$.

In the present application, this argument remains close to 180°; as a consequence the corresponding error is negligible; this has enabled the reduction of the time for carrying out the correction but it would have been possible to include it in our calculation by modifying the formula $A_i = i \times A$, that is to say by adding to $A_i$, thus calculated, an algebraic value $\phi(f_i)$ that it would have been possible to define in a table. ($A_i$ being the value of the angle of the harmonic of order $i$ and $f_i$ being its frequency, that is to say $f_i$ equals $b \times i \times f_r$).

The search for values such as $\cos A_i = \cos (i\, b\, A)$ consists in: a calculation of $A_i =$ the remainder from the division by 400 of $(i \times b \times A)$; a comparison of $A_i$ with the successive values 100, 200, 300, 400 in such a manner as to recognise the quadrant to which $A_i$ belongs; a utilisation of a table of cosines of the first quadrant to obtain the resultant $\cos A_i$.

Having now the Fourier coefficients, interpolated then corrected and the values of the terms $\cos A_i$, the ovalisation can be calculated; in fact, it is evaluated in an iterative manner harmonic by harmonic.

The ovalisation having been calculated, and also the profile, it is only necessary to add these two values according to the formula:

$$F_r(z,A) = F_p(z) + F_o(z,A)$$

It is then necessary to effect the preparation of the analogue data to be sent out, on the next request for calculation, to the smoothing interpolator. It is necessary, for the interpolator, to prepare the value representing the relative grinder-workpiece distance at the beginning of the next sampling period, this value being called VPRE, as well as the total variation of the relative grinder-workpiece distance in the course of this next period, this variation being called DIFF. These two values are determined according to the following sequence:

(VFIN) → VPRE last calculated result $F_r(z,A)$ → VFIN (VFIN) − (VPRE) → DIFF

VPRE and VFIN being the symbolic names of the memory words which hold, between two samplings, the corresponding values, which values are respectively denoted (VPRE), (VFIN).

This preparation being terminated, the programme "goes round" in a waiting loop in which the calculation demand indicator is tested. As soon as it is positioned by the interruption-coder sub-programme, the programme of calculation in real time leaves its waiting loop, releases the indicator, and transmits the output data sequence to the smoothing interpolator.

This sequence consists of: a resetting to zero of the smoothing interpolator; output of the value (VPRE); output of the value (DIFF).

The end of the resetting to zero of the smoothing interpolator is then effected.

b. The smoothing interpolator 20 shown in FIG. 4, which comprises in particular a monostable circuit 31 and an anti-saturation device 32, supplies to the "pass system" 21 an instruction $\bar{F}_r(z,A)$, thus noted for the differential of $F_r(z,A)$ calculated by the computer, the development of which, as a function of time, is linear between two calculation demands. The computer on the other hand supplies at each calculation demand two analogue instructions which are constant during a sampling period (a period separating two successive calculation demands) through the intermediary of two distinct analogue numerical converters.

The function derived by the analogue smoothing interpolator is thus:

$$\bar{F}_r(z,A) = \frac{(DIFF)}{\Delta T} \times t + (VPRE)$$

$t$ varying from 0 to $t_{max} = \Delta T$ $\Delta T$ being called the sampling period which is constant for the machine embodying the invention and is equal to 2.5 milliseconds. It is evident that for $t = 0$, $\bar{F}_r(z,A) =$ VPRE and for $t = \Delta T$, $\bar{F}_r(z,A) =$ (DIFF) + (VPRE), a value which becomes, thanks to the computer, the following (VPRE) for the next period of sampling.

The interpolator 20 comprises an integrator 124 of adequate performance, intended to generate the function $$\frac{(DIFF)}{\Delta T} \times t,$$

an analogue adder 123 giving $\bar{F}_r(z,A)$, a monostable circuit 31 intended to reduce the duration of the zero resetting pulse of the integrator transmitted by the computer at each calculation demand, and an anti-saturation device 32.

The integrator 124 must be designed to introduce few errors into the function which has to be developed (offset currents, variation of the values of the elements, etc. . . . ). The constant of integration is here given by $RC = \Delta T = 2.5$ milliseconds.

Returning to the machine as a whole, it should be noted that the possible variations in the speed of rotation of the workpiece must be limited in such a manner as on the one hand to limit the error introduced by any variation of $t_{max}$ and on the other hand to avoid an instantaneous reduction of $t_{max}$ to such a point that a calculation demand would be developed before the last calculation of $F_r(z,A)$ is finished.

The monostable circuit 31 receives a pulse of 100 microseconds and transmits a pulse of the order of 15 microseconds to a field effect transistor 125 connected in parallel with the capacitor C129 of integration. The transistor, which is conducting for 15 microseconds, wholly discharges the capacitor C129. During the remainder of the sampling period the resistance of the field effect transistor 125 is sufficiently great not to disturb the operation of the integrator.

The analogue adder 123 which generates $\bar{F}_r(z,A)$ filters additionally frequencies higher than 300 Hz to reduce the effect of the integrator zero-resetting duration on $\bar{F}_r(z,A)$.

If the output of the integrator 124 reaches a voltage value approaching saturation, either as a consequence of too high a value of DIFF, or as a consequence of an abnormal operation (reduction of the speed at A, fault in the integrator . . . ), an anti-saturation device 32 is activated. It is intended to limit the output voltage of the integrator 124 to a value less than the saturation value of the amplifier. Thus, on the arrival of the zero-resetting pulse, the integrator 124 being unsaturated, the recovery time of the amplifier 122, connected as an integrator, does not intervene and does not prolong the duration of the zero-resetting. The device 32 ensures the conduction of a field effect transistor 128 as soon as the output of the integrator 124 reaches a given threshold, positive or negative. The said field effect transistor 128 is arranged in series with two Zener diodes 126 and 127 connected in opposite orientations, the whole being in parallel with the capacitance C129. This particular arrangement provides, if the output voltage of the integrator 124 remains lower than the above-mentioned threshold, an impedance which is distinctly higher than that of two diodes connected in opposite orientations and therefore affects very little the operation of the integrator. As soon as the threshold is reached at the output of the integrator 124, the field effect transistor 128 in series with the Zener diodes 126 and 127 conducts and the output voltage of the integrator 124 is limited to a voltage given by the Zener voltage of one of the diodes added to the diode threshold of the other Zener, the total value being less than the saturation voltage of the amplifier.

The interpolator described has a linearity error less than 5 millivolts (in relation to a complete scale of 10 volts).

c. The pass system shown in FIG. 5 comprises an adder $F_{pa}33$ connected to a logic circuit 34 with a permanent store.

The position of the rocker or oscillating cradle is determined by the value of the instruction sent to the position servo of the said rocker. As has been seen above, the instruction developed by the instruction generator is $\overline{F}_r(z,A)$.

This is in fact the dynamic or evolutive instruction representing the geometric form to be obtained. The true instruction sent to the position servo is the sum of the instruction $\overline{F}_r(z,A)$ and the value $F_{ps}$, and it is the pass device which ensures the feed of the workpiece towards the grinder, this feed being in steps or discrete values, until the last pass, by changing the value of $F_{ps}$ at the end of each pass.

Figure 2G:
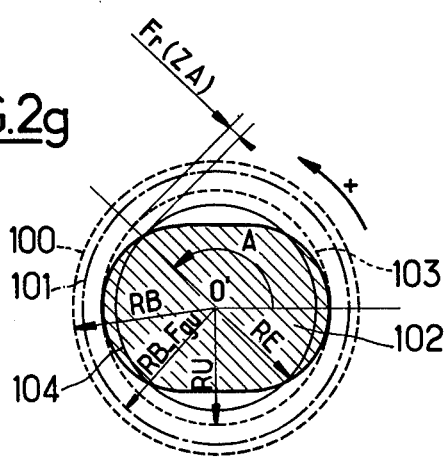
Figure 6:
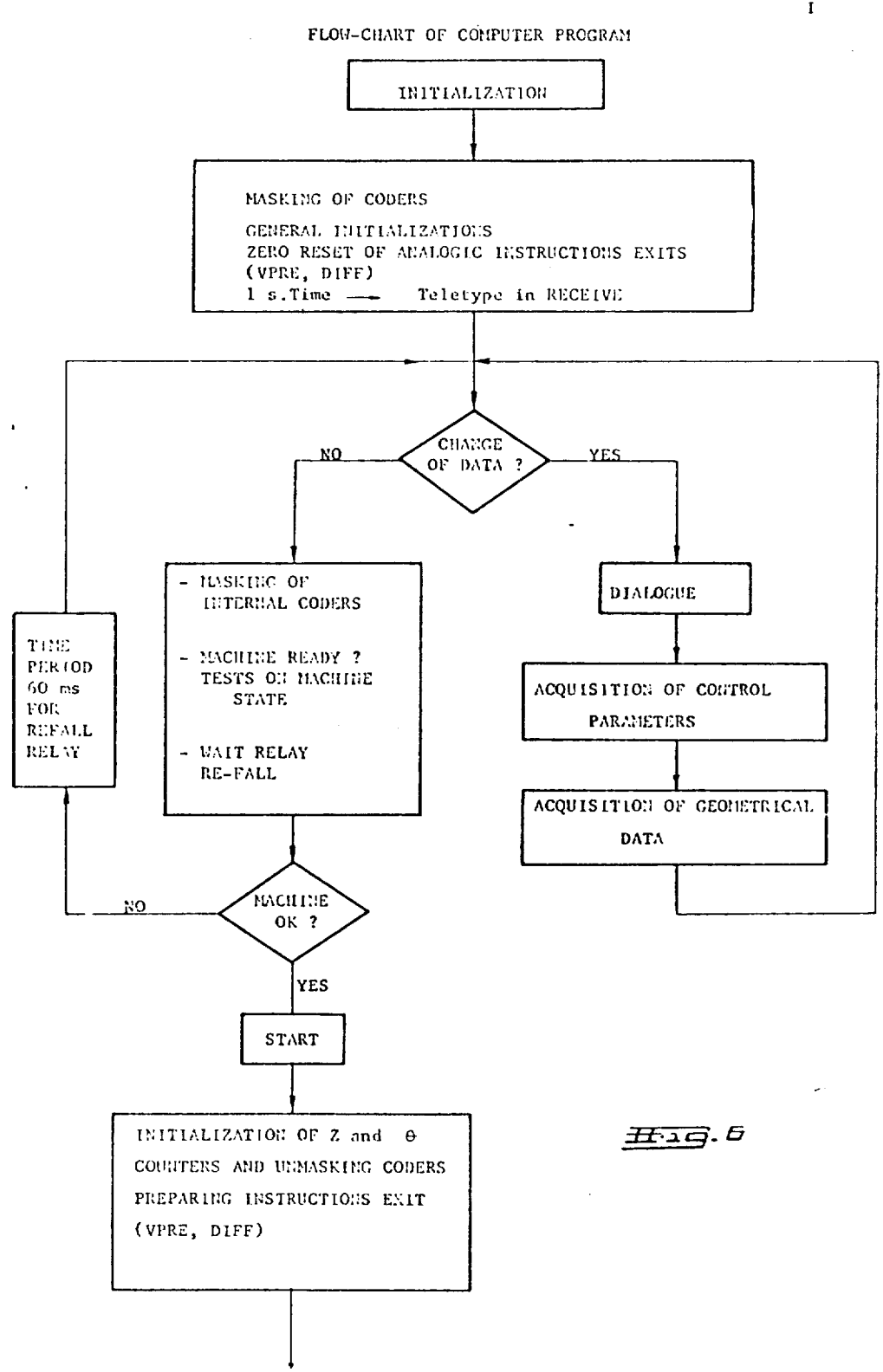
FIGS. 6 to 9 are flow-charts of a computer program which may be utilized in the invention.
Figure 7:
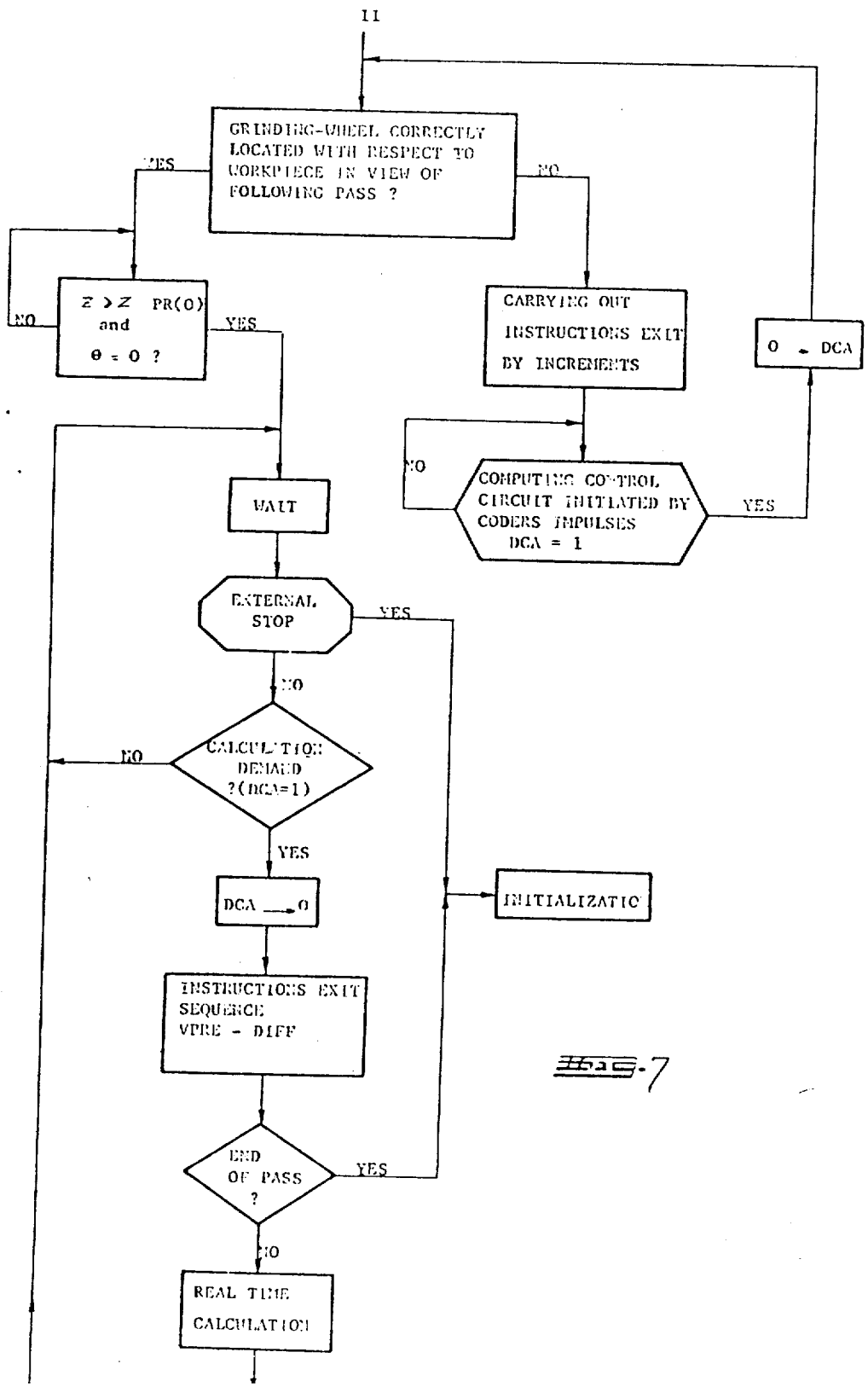

Referring to FIG. 2g, there is defined a cylindrical copier 104 termed the "standard copier" of radius RE less than the "rough" radius RB of the copier to be machined. All the dimensions and measurements are taken from this reference which is the mechanical and electrical zero of the machine for the positioning servo of the oscillating cradle. The radius of the cylinder circumscribed on the machined copier is called RU. The parameter RU − RE represents therefore the distance between the cylinder circumscribed on the machined copier and the standard copier.

There is defined a machining zone comprised between two planes situated on each side of the copier. Outside this zone and for the whole of the duration of the machining cycle, the cradle is in a "recoil" or "withdrawn" position defined by $F_{ps} = F_{pso}$.

In the dialogue task of the computer, the calculation of the maximum value of $F_r(z,A)$ for the copier in question can be demanded.

This value is supplied to the operator who can thus regulate the parameter $F_{pa}$ of the function $F_{ps}$ so that at the first pass the grinder becomes tangential with the copier at a place (or places) where $F_r(z,A) = F_r(z,A)$ max.

The imperfections of the rough copier surface will also be taken into account by the introduction of a dimension $F_{gu}$, called the "machining guarantee," which corresponds to the minimum quantity of material to be removed from the radius of the rough copier to be sure that the whole of the surface of the said copier has been machined.

The role of the pass system 21 is on the one hand to bring about the development of the position instruction of the rocker by analogue summation of $\overline{F}_r(z,A)$ and $F_{ps}$, and on the other hand to develop the quantity $F_{ps}$ which can take either the value $F_{pso}$ outside the machining zone or $F_{ps}$ as written below in the machining zone:

$$F_{ps} = (RU - RE) + F_{pa}$$

with $|F_{pa}| \geq |F_r(z,A)|\text{max}$ — before the execution of the first machining cycle or pass $F_{pa}$ thus represents the total depth of the displayed phases.

The principle behind the calculation of the static position of the cradle thus adopted, given by the equations enumerated above, is that which leads at the end of the machining (when the passes are exhausted, that is to say $F_{pa} = 0$) to a minimum error in the position of the cradle.

The operator displays on the desk the depth of pass ppe in the rough stage, the depth of pass ppa in semi-finishing, the depth of pass ppf in the finishing stage, then with the aid of selectors the number of passes npe desired in the rough stage, the number of passes npa in the semi-finishing stage and the number of passes npf in the finishing stage.

He also displays the quantity RU − RE. This latter is, in the general case, in the same sense (or sign) as $F_{pa}$. It is however possible, if it is desired to return to or modify a copier of which the RU − RE is close to zero, to provide a RU − RE in a sense opposite to $F_{pa}$. The data (RU − RE, ppE, npe etc.) are entered via potentiometers. The potentiometer for entering (RU − RE) has two positions connected by a switch. The ppE potentiometer is stationary whilst the remaining potentiometers have moveable studs.

The operator has available, to provide the RU − RE display, a decade measuring apparatus which enables the dimensions to be adjusted to be visualized.

The function $F_{pa}$ is given by:

$$F_{pa} = npe \times ppe + npa \times ppa + npf \times ppf$$

It is carried out in the pass system 21 with the aid of an analogic adder 130 for which the number of input resistors 133, 134 and 135 in circuit depends on the preselected numbers npe, npa and npf.

A second analogic adder 131 generates the function $F_{pa} + (RU - RE) = F_{ps}$ and thus develops from the seven displayed parameters on the desk $npe, npa, npf, ppe, ppa, ppf, RU−RE$, the static position of the cradle in machining. Outside the machining zone, the instruction $F_{ps}$ is changed to $F_{pso}$ and any modification of $F_{ps}$ during this period is inoperative in relation to the position of the rocker.

A third adder 132 develops the function $F_r(z,A) + F_{ps}$.

Each of the devices 130, 131 and 132 comprise an operational amplifier having a feedback look including a resistor. Devices 133, 134 and 135 are achieved by adding analogic voltages which are obtained by means of resistors in parallel relationship and controlled by relays whose number is progressively decreased at each pass.

At each machining cycle (except during planing) a pass, which may be *ppe, ppa* or *ppf*, is taken from or decremented from the function $F_{pa}$.

The order for decrementing is sent to a permanent-memory logical system which switches the said order to the adder $F_{pa}$. The logic takes into account the order of succession of the machining phases, an order which is pre-established in the following manner, namely first the phase of rough machining, then semi-finishing and finally finishing, the number of passes effected in the machining phase and the number of passes remaining to be carried out in the machining phase. The store is necessary in case of power failure or stopping of the machine in the course of machining (for example continuation of the machining the next morning). The machining of one phase is terminated when the number of passes effected corresponds to the number of passes displayed on the selector.

Safety devices known as "parameter modifying devices" for use in the course of machining, are included in this system. Thus, a rotation, even a slow rotation, of one of the analogue display potentiometers ppe, ppa, ppf, RU — RE, causes the immediate stopping of the machine by a recoil or withdrawal sequence of the dangerous parts. In the same way, a variation of the number of passes in the course of machining leads to the same safety sequence.

When the operator wishes to carry out a pass without decrementing, that is to say to re-make a pass without modifying $F_{ps}$, he can do this in the form of a planing pass. There is then a cancellation of the counting of passes and there is no decrementation.

Two modes of operation are provided for this machine: a "manually controlled" mode in which the operator effects each movement in the machining cycle separately; and an alternative automatic mode in which the only intervention by the operator is at the start.

An attached device permits the replacement of the instruction $\bar{F}_r(z,A)$ by a manually adjustable potentiometer, which is of interest in that it permits the production of a cylindrical copier without using the computer and permits the adjustment of the parameters of the machine.

The operations at level III control the servo for positioning the grinder with respect to the workpiece, owing to the structure in the machine and to the different pick-offs.

The positioning of the oscillating cradle is effected by a position servo with three concentric loops. The first loop or internal loop is a current or stress loop, of which the controlled activator is a linear motor, for example a vibrating pot 7 of the electro-dynamic type. The second loop is a speed loop for which the pick-off 11 is of the electro-dynamic type. Finally, the third loop, which is the external or position loop, is a loop for which the position pick-off 12 is of the capacative type, which capacitance, placed in an H.F. carrier bridge and demodulated, translates the position with a scale of 1 millivolt/$\mu$.

The activator is designed to withstand high stresses for frequent demands which can rise to 20 Hz and can lead, when the mass of the rocker to be oscillated is taken into account, to high accelerations.

The acceleration depends not only on the frequency of the injected signal but also on its amplitude. For the machine described, and to take into account the large number of required harmonics, it is necessary that the amplitude of the harmonics fulfills the following condition:

$$a_i \leq \frac{a\ 1\ max}{i^2}$$

$a\ 1\ max$ being the maximum amplitude of the fundamental which is here 750 $\mu$ The current loop has a pass band, in the closed loop condition, of the order of 2,000 Hz. The speed loop must have a limited pass band to take into account the resonance frequencies of the different mechanical parts. In the closed-loop condition, this pass band is in this case 200 Hz.

The position loop must, on the one hand follow the evolutions of $\bar{F}_r(z,A)$ which has, in a Fourier series analysis, harmonics of which the frequency can reach 20 Hz, and on the other hand, must cope with various perturbations, and must have an open-loop gain which is as high as possible in the frequency band from 0 to 20 Hz. For this purpose, an integrator 23 has been provided in the position loop. Thus, in the frequency band from 0 to 20 Hz, the gain of the open position loop is of the form:

$$G(f) = -\frac{Ko}{f^2}$$

The gain at the frequency $f_i$ of the harmonic of order $i$ is thus $$G(f_i) = -\frac{Ko}{(bf_i)^2}$$ while the phase displacement remains substantially constant and equal to $-180°$ The pass band in the closed-loop condition of the position servo is of the order of 100 Hz.

To achieve such performance, in addition to the standard precautions, it was necessary to choose a position pick-off 12 for which the noise, at frequencies less than 200 Hz, is itself less than 500 microvolts, in the knowledge that the scale of the said pick-off is 1 millivolt/$\mu$.

The position servo possess an error signal E which guides the system. If one injects a periodic sinusoidal instruction at the input of amplitude $a_i$ at the frequency $f_i$, the output differs from the input (assuming a unitary return) by the quantity $E_i$:

$$E_i = \text{input} - \text{output} = a_i - S$$

Applying to the input a sinusoidal instruction signal of amplitude $a'_i$ calculated in the following manner:

$$a'i = a_i\left(1 + \frac{1}{G(f_i)}\right) = a_i\left(1 - \left(\frac{b\ if_r}{k_o}\right)^2\right)$$

the output has an amplitude equal to $a_i$. Thus one can effect in the computer a correction at each coefficient $a_{ij}$ calculated to be free of the systematic error of the position servo.

Of course, there is no compensation for the errors brought about by the perturbations due to the position servo (grinder drive, vibrations, etc.).

At the time of the course rocking of the cradle from the static position $F_{pso}$ to the machining position $F_{ps}$, the position instruction is a step and the servo goes into saturation. For this purpose, two temporary safety devices detect too long a saturation of the servo by taking the position error data on the one hand and the speed error data or current instruction, on the other hand. One or other or both safety devices act by first commanding the withdrawal of the grinder and then the cutting off of the vibrating pot which actuates the rocker as soon as an abnormal saturation appears (abnormal stress, blockage of a part, rupture of a pick-off connection, fault in the servo electronics, etc. ... ).

The position servo thus described may have too low a damping and may lead, at the time of a step command, notably when voltage is applied and at the position instruction $F_{ps}$ or $F_{pso}$, to oscillations with little damping around the position. It is therefore preferable at such a time to temporarily shunt the integrator added in the position loop, at the risk of causing a position error or a speed error.

It is of course understood that the embodiment which has been described is subject to various changes, improvements or additions or to the replacement of certain elements by equivalent elements, without altering the nature of the invention.

In particular, variations can be made to the computer:

1. The sampling period in the machine described above is constant. In fact, to allow higher speeds of rotation, it would be possible to utilise the fact that the period of the "real time calculation" is a function of the number of harmonics. If for $q$ with a reduction in the number of harmonics there can be obtained a reduction of the sampling period in a ratio $q$, it suffices to multiply by q the value (DIFF) transmitted to the smoothing interpolator and to re-adjust, because of the anticipation, the constants of the initial setting up of the counting word of the variable A.

2. Any interpolation other than linear to define $F_p(z)$ between the privileged profile sections or the coefficients $a_{ij}(z)$ between the privileged sections of ovalisation, is possible to the extent that it does not require calculations which are too long in real time.

3. The ovalisation function may be a periodic function which does not have symmetry. It is then necessary to consider either the cosine terms alone with the constant phase displacements in a privileged section, but which are variable as a function of $z$ like the coefficients $a_{ij}$, or to add to the series of cosine terms a series of sine terms.

The general process of calculation is not modified, the anticipation, the principle of using a cosine table, the principle of management of the coder interruptions, remaining identical.

4. When the speed of rotation of the workpiece is such that the time separating two coder pulses is less than the calculating time, one can start the calculation at every $p$ pulses, $p$ being chosen in such a manner that $p$ multiplied by the time separating two pulses is as close as possible to the period of the calculating cycle.

5. For the machine described, at each pass the calculator associated with the smoothing interpolator develops an instruction $F_r(z,A)$ which does not depend on the static position $F_{ps}$ of the cradle. The role of the pass system is to ensure at each new pass the step feed of the cradle towards the grinder, by suitably modifying $F_{ps}$.

One can obtain the same result by calculating $F_r(z,A)$ plus $F_{ps}$ in the computer instead of making an external analogue summation for the computer, without modifying the material configuration of the computer, except for the numerical inputs (*npe, npa, npf, ppe, ppa, ppf, Ru, Re*). But, taking into account the large values which $F_{ps}$ may take and the maximum voltage provided by the digital-analogue converters, the analogue voltage representing a micron would be about 2-3 times smaller than that which has been adopted on the machine described and, as a consequence, noise would have an influence 2 to 3 times as great.

We claim:

1. A process of machining a three-dimensional surface of a workpiece driven in rotation about a first axis and displaced in translation along a second axis substantially parallel to the first, with respect to a tool, so that all the points of the surface of the said workpiece can be presented successively to the said tool, the distance between the tool and the workpiece being variable by relative displacement in a direction distinct from that defined by the two said axes, the process being effected by a numerically controlled machine tool comprising a computer having in store data permitting the surface to be machined to be defined by calculation, in which the speed of rotation of the said workpiece about the said first axis is controlled independently of the speed of displacement, of the workpiece along the said second axis, which is itself independently adjustable, in which the relative position of the workpiece and tool is numerically controlled in the said direction as a function of the rotary speed and angular position of the workpiece relative to the first axis and its speed and position along the second axis in such a manner that the tool machines the desired surface, and in which the instruction for relatively positioning the workpiece and the tool is given in the form of a sum of a profile function and an ovalisation function, the profile function providing the dimension difference, measured perpendicularly to the said axis, between the profile of the said workpiece in a selected profile plane of the said workpiece, the plane passing through the first axis, and the generatrix contained in this same plane of the section of the basic body of revolution co-axial with the said first axis and circumscribed on the said workpiece in such a manner as to have in common with it at least one point on their respective surfaces, the said selected profile plane being chosen in such a manner as to contain the said point, and the ovalisation function being the dimension difference between the outline of the said workpiece in a section through a plane perpendicular to the first axis and a circle in this plane with its centre on the said first axis, the said circle being circumscribed on and tangent to at least one point on the said outline in the said section, the said difference of dimension being measured along a radius passing through the said first axis, in the sectional plane through the first axis.

2. A method according to claim 1, in which the dimensional difference in the selected profile plane is that between the profile of the said workpiece and the generatrix of the body of revolution circumscribed in a small number of privileged profile sections perpendicular to the first axis, the said dimensional difference in any other standard section perpendicular to the first axis being obtained by linear interpolation of the dimensional differences in the privileged profile sections enclosing the standard plane and as a function of the distance of the standard section from the privileged profile sections which enclose it.

3. A process according to claim 2, in which the ovalisation function in a small number of sections perpendicular to the first axis, known as privileged sections of ovalisation, is defined by the coefficients of the first $n$ harmonics, $n$ being comprised between 1 and 20, of a Fourier series.

4. A method of numerical control according to claim 3, in which the ovalisation function in any section perpendicular to the first axis is defined by the coefficients of the first $n$ harmonics of a Fourier series, the said coefficients being derived by interpolation of the coefficients of the harmonics of equal order of the ovalisation functions of two privileged sections enclosing the said chosen perpendicular plane.

5. A process according to claim 4, in which the said interpolation is linear as a function of the distance of the said chosen perpendicular section from the two privileged ovalisation sections enclosing the said chosen section.

6. A process of machining according to claim 1, in which the angular position of the workpiece about the said first axis and its position along the said second axis are measured by means of incremental pulse coders, and in which the wavefront of one pulse in $p$ pulses emitted by the coder indexing the position of the workpiece about its first axis is used to synchronise the calculation of the distance between the workpiece and tool, the value of $p$ being defined in such a manner that the maximum duration of a calculation of the relative distance between the tool and workpiece is less than $p$ times the duration separating two pulses from the said workpiece position coder.

7. A process of machining according to claim 1, in which the angular position of the workpiece about the said first axis and its position along the said second axis are measured by means of incremental pulse coders, and in which the wavefront of each of the pulses emitted by the coder indexing the position of the workpiece about the first axis is used to start the continuous transmission of at least one analogue signal which forms the instruction for the relative position of the workpiece and tool which has been calculated at the time of the preceding computation of the relative workpiece-tool distance.

8. A method of machining according to claim 1, in which the angular position of the workpiece about the said first axis and its position along the said second axis is measured by means of incremental pulse coders, and in which each pulse transmitted by the coders indexing the position of the workpiece about the first axis and along the second axis is used to increment counters provided in the control computer, the values of the numbers contained in the said counters representing the angular position of the workpiece about the said first axis and its axial position along the said second axis.

9. A process according to claim 1, in which the algebraic sum of the ovalisation function and of the profile function developed by the command calculator and depending only on the angle of reference of the workpiece about the first axis and its position along the second axis, is incremented at each machining pass by a certain amount corresponding to the thickness of each desired machining pass, before being applied to a positioning servo system controlling the position of the workpiece with respect to the tool, the value of the said amount and the number of passes being capable of being modified by the machine operator without effect on the values developed by the computer or on the given geometric data arranged in the store of the said computer which defines the surface to be produced.

10. A process according to claim 6, in which the calculation of the workpiece-tool distance is offset by at least two pulses in advance of the actual tool-workpiece position.

11. A process according to claim 3, in which the coefficient of each of the harmonics of the Fourier series defining the ovalisation function in the command computer of the machine is multiplied by a constant coefficient for each of the harmonics, the said coefficient being determined in such a manner as to correct the errors due to the transfer function of the servo controlling the relative position of the workpiece and tool.

12. A process according to claim 7, in which, from the command computer of the said machine, at each wavefront of the position coder synchronising pulses corresponding to the position of the workpiece about its first axis, there are transmitted a signal representing the workpiece-tool position corresponding to the said pulse wavefront and another signal corresponding to the value of the difference between this position and the workpiece-tool position which must be achieved at the following pulse wavefront, the said two values being transmitted to a smoothing interpolator.

13. A process according to claim 12, in which in turn there is transmitted by the said smoothing interpolator to the servo controlling the relative positions of the workpiece and tool, an analogue signal without discontinuity varying linearly with time and which is equal at each pulse wavefront to the value corresponding to the workpiece-tool dimension corresponding to each of the angular positions at the said pulse wavefronts.

14. In a numerically controlled machine tool system for machining the three-dimensional surface of a workpiece, including a tool for machining the workpiece in a number of machining passes, a workpiece support mounted for pivotal motion about an axis, means for rotating the workpiece about an axis parallel to the said axis of pivotal motion, and a table which supports the pivoting support, mounted for displacement in a direction parallel to the first axis, means for adjusting the workpiece-tool distance by pivoting the said support, the said distance-adjusting means comprising:
   coding means for generating coder signals corresponding to pivotal movement of the workpiece about the said first axis and movement of the workpiece in the said direction parallel to the first axis;
   a computer receiving the coder signals;
   a positioning servo for positioning the pivoting support, the positioning servo having a first loop including an electro-dynamic motor, a second loop connecting to the servo system a workpiece speed pick-off, and a third loop connecting to the servo system a workpiece position pick-off;
   a smoothing interpolator connected to the output of said computer;
   and a pass-control system controlling the said machining passes and connecting the output of said smoothing interpolator to the servo system.

15. A machine tool according to claim 14, in which the smoothing interpolator comprises a zero resetting monostable circuit, an integrator having a first output connected to an anti-saturation device and a second output connected to a first analogue added.

16. A machine tool according to claim 15, in which the integrator comprises, in parallel, a capacitor, a first transistor, and a series chain of a second transistor with two diodes mounted in opposite orientations, an input of the integrator being constituted by the input electrode of the first transistor and an output of the integrator being constituted by the input electrode of the second transistor.

17. A machine tool according to claim 16, in which the pass system comprises: analogue multipliers providing the product of the depth of pass and the number of passes respectively in rough machining, in semi-finishing and in finishing; a second analogue adder connected in parallel with the outputs of the analogue multipliers; a third analogue adder connected to the output of the second adder as well as to an input providing a predetermined parameter and a fourth analogue adder connected to the output of the third adder as well as to the output of the first adder contained in the smoothing interpolator.

18. A machine tool according to claim 17, in which the pass system comprises in addition a logic unit with permanent store connected to the inputs of the analogue multipliers and additionally receiving the pass decrementation instructions and acting through its outputs on the operator of the said analogue multipliers.

19. In a process of machining a three-dimensional surface of a workpiece which is rotated about a first axis and displaced along a second axis substantially parallel to the first, with respect to a tool, the distance of which from the workpiece is variable, the speed of rotation of the workpiece and the speed of displacement of the workpiece along the second axis being independently adjustable, the process being effected by numerical control as a function of the angular position of the workpiece about the first axis and its position along the second axis, the steps of:

entering into a store data permitting the definition, by calculation, of the surface to be obtained by machining;

and deriving a control instruction for relatively positioning the workpiece and the tool in the form of the sum of a profile function and an ovalisation function;

said profile function providing the dimensional difference, measured perpendicularly to the first axis, between the radius of a circle circumscribed in a selected plane on the outline of the said workpiece and centred on the said first axis, and the generatrix, contained in the same plane, of the section of the body of revolution co-axial with the first axis and circumscribed on the said workpiece; said ovalisation function being the dimensional difference, measured along a line radial to the first axis, between the outline of the workpiece in the said plane and the said circle in this plane circumscribed on the workpiece outline.

* * * * *

UNITED STATES PATENT OFFICE
CERTIFICATE OF CORRECTION

Patent No. 4,027,245          Dated May 31, 1977

Inventor(s) Pierre Bourrat, et al

It is certified that error appears in the above-identified patent and that said Letters Patent are hereby corrected as shown below:

The attached Figures 6 thru 9 should be added, respectively.

Signed and Sealed this

Sixth Day of December 1977

[SEAL]

Attest:

RUTH C. MASON  
Attesting Officer

LUTRELLE F. PARKER  
Acting Commissioner of Patents and Trademarks